US012764217B2

(12) United States Patent
Deng

(10) Patent No.: US 12,764,217 B2
(45) Date of Patent: Oct. 13, 2026

(54) MOBILE PHONE HOLDER

(71) Applicant: Jinhua Deng, Xiantao (CN)

(72) Inventor: Jinhua Deng, Xiantao (CN)

( * ) Notice: Subject to any disclaimer, the term of this patent is extended or adjusted under 35 U.S.C. 154(b) by 211 days.

(21) Appl. No.: 18/924,693

(22) Filed: Oct. 23, 2024

(65) Prior Publication Data

US 2026/0113396 A1 Apr. 23, 2026

(51) Int. Cl.
*H04M 1/04* (2006.01)
*F16B 47/00* (2006.01)
*F16M 11/04* (2006.01)
*F16M 13/02* (2006.01)
*H02J 7/70* (2026.01)
*H02J 50/10* (2016.01)

(52) U.S. Cl.
CPC ............... *H04M 1/04* (2013.01); *F16B 47/00* (2013.01); *F16M 11/041* (2013.01); *F16M 13/022* (2013.01); *H02J 7/731* (2026.01); *H02J 50/10* (2016.02)

(58) Field of Classification Search
CPC ..... H04M 1/04; F16M 11/041; F16M 13/022; F16B 47/000996
See application file for complete search history.

(56) References Cited

U.S. PATENT DOCUMENTS 11,548,451 B2 * 1/2023 Jankura .................. B60R 11/02
11,563,838 B1 * 1/2023 Sham .................. H04M 1/0202
11,635,106 B1 * 4/2023 Song ....................... F16B 47/00 248/206.2
11,786,031 B1 * 10/2023 Backus ............... H04M 1/0281 224/577
11,818,285 B2 * 11/2023 Sobh ...................... H01R 13/72
12,381,970 B2 * 8/2025 Liu ......................... H04M 1/04
12,467,580 B1 * 11/2025 Zhi .......................... A61L 9/042
12,471,722 B2 * 11/2025 Jakobuco ................ F16B 47/00
12,480,617 B1 * 11/2025 Yang ........................ F16B 47/00
12,503,062 B2 * 12/2025 Choo ....................... B60R 11/02
12,559,288 B2 * 2/2026 Lin ........................... A45F 3/16
12,595,880 B2 * 4/2026 Jakobuco ............ B60R 11/0241
12,623,483 B1 * 5/2026 Zrihen .................... B44D 3/123
2018/0198900 A1 * 7/2018 Schachter ............. G06F 1/1632
2020/0045157 A1 * 2/2020 Ajani ................... F16M 11/041
2020/0063915 A1 * 2/2020 Lederer .................. F16M 13/04
2022/0085629 A1 * 3/2022 Sobh ...................... H01R 13/72
2023/0291822 A1 * 9/2023 Liu ........................ G06F 1/1686
2023/0328164 A1 * 10/2023 Kang .................. F16M 13/022
(Continued)

*Primary Examiner* — Patrick F Marinelli

(57) ABSTRACT

The present application provides a mobile phone holder related to the technical field of mobile phone accessories, including a bottom shell, a base arranged inside the bottom shell, and a suction cup and a magnet block fixedly installed at the bottom of the base. The present application can achieve double adsorption by arranging the suction cup and the magnet block. The suction cup uses the negative pressure principle to be tightly adsorbed on various non-magnetic smooth surfaces such as glass, plastic, and wood, providing users with a wide range of placement options. At the same time, the magnet block is specially designed for objects made of iron or containing ferromagnetic materials, such as metal desktops, car dashboards, etc., and is directly adsorbed by magnetic force without any additional fixing devices, achieving the convenience of quick installation and disassembly.

5 Claims, 6 Drawing Sheets

(56) References Cited

U.S. PATENT DOCUMENTS

| | | | | |
|---|---|---|---|---|
| 2024/0333828 | A1* | 10/2024 | Yeo | H04M 1/0281 |
| 2024/0344656 | A1* | 10/2024 | Jakobuco | B60R 11/0241 |
| 2024/0382020 | A1* | 11/2024 | Jakobuco | H04M 1/04 |
| 2025/0361981 | A1* | 11/2025 | Yang | F16B 47/00 |
| 2026/0019491 | A1* | 1/2026 | Du | H04M 1/04 |
| 2026/0113396 | A1* | 4/2026 | Deng | F16M 11/041 |

* cited by examiner

MOBILE PHONE HOLDER

FIELD OF THE APPLICATION

The present application relates to mobile phone accessories. More specifically, the present application relates to mobile phone holders.

BACKGROUND

The increasing prevalence of smartphones has led to people depending on their mobile phones for entertainment, work, study, and various other activities in their daily lives. To accommodate the diverse usage of mobile phones in different situations, mobile phone holders have become a popular accessory. They serve as a helpful tool for users to securely place their phones in various environments, allowing them to free their hands and enhance their overall user experience.

Most of the mobile phone holders available on the market have a single design and rely on clamping, supporting, or fixing the base to hold the phone in place. However, these solutions are limited in their versatility and flexibility, and may not meet all needs. Therefore, we have made improvements and proposed a new mobile phone holder.

SUMMARY

The purpose of this application is to solve the problem that most of the existing mobile phone holders have a single design and lack versatility and flexibility.

The technical problem to be solved by the present application is to address the shortcomings of the aforementioned technology and introduce a mobile phone holder.

The mobile phone holder comprises a bottom shell, a base is arranged inside the bottom shell, and a suction cup and a magnet block are fixedly installed at the bottom of the base As a preferred technical solution of the present application, the suction cup is arranged in a circular ring shape, and the magnet block is located at the center of the suction cup.

As a preferred technical solution of the present application, the outer surface of the base is rotatably connected to the inner wall of the bottom shell.

As a preferred technical solution of the present application, a connecting column is inserted and connected in the middle of the base, a baffle is fixedly connected to the bottom of the connecting column, and the connecting column and the base are connected by bolts.

As a preferred technical solution of the present application, a plurality of raised ridge are arranged on the inner wall of the base, and the raised ridge are in contact with the outer surface of the connecting column.

As a preferred technical solution of the present application, an upper shell is arranged above the bottom shell, two first connecting seats are arranged at the bottom of the upper shell, a connecting plate is connected between the two first connecting seats by bolts, and two second connecting seats are arranged on the top of the bottom shell, and the connecting plate and the two second connecting seats are connected by bolts.

As a preferred technical solution of the present application, a plurality of pads are fixedly installed at the bottom of the inner cavity of the upper shell, a circuit board is placed between the tops of the plurality of pads, a power supply interface is provided on the circuit board, and a through hole for connecting to the power supply interface is opened on the upper shell.

As a preferred technical solution of the present application, an upper cover located above the circuit board is arranged in the upper shell, and a wireless charging coil is arranged in the upper cover.

As a preferred technical solution of the present application, a magnet ring is also provided inside the upper cover.

As a preferred technical solution of the present application, a cover plate is provided between the magnet ring and the top of the wireless charging coil.

Compared with the prior art, this application has the following beneficial effects:

The present application aims to solve the limitations of traditional mobile phone holders by offering dual adsorption through a suction cup and a magnet block. The suction cup utilizes negative pressure to tightly adhere to non-magnetic smooth surfaces such as glass, plastic, and wood, providing various placement options. On the other hand, the magnet block is designed for iron objects or those containing ferromagnetic materials, such as metal desktops and car dashboards, allowing for quick installation and disassembly through magnetic force. This dual adsorption design enables the mobile phone holder to be used in diverse scenarios, whether at home, in the office, in the car, or outdoors, without the need for additional tools or accessories. By combining the suction cup and the magnet block, the mobile phone holder can be used on almost all common smooth surfaces and iron objects, catering to different users'needs and enhancing its versatility and flexibility.

BRIEF DESCRIPTION OF THE DRAWINGS

As shown in FIGS. 1-6:

Figure 1:
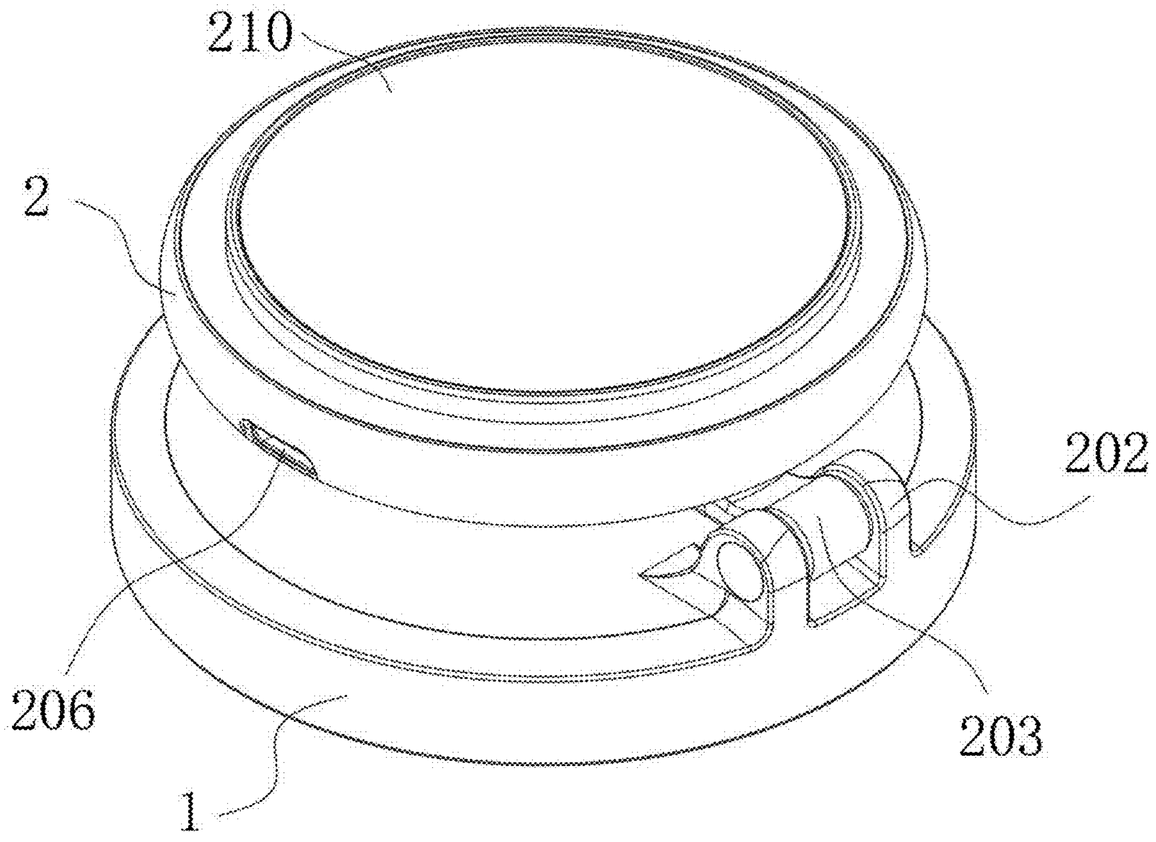
FIG. 1 is a perspective view of a mobile phone holder, according to an embodiment.

1. Bottom shell;
101. Base;
102. Connecting column;
103. Baffle;
104. Magnet block;
105. Suction cup;
106. Raised ridge;
2. Upper shell;
201. First connecting seat;
202. Second connecting seat;
203. Connecting plate;
204. Pad;
205. Circuit board;
206. Power supply interface;
207. Upper cover;
208. Magnet ring;
209. Wireless charging coil;
210. Cover While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As described in the background technology, most of the existing mobile phone holders on the market have a single design, and the mobile phone holders are mainly placed and fixed by clamping, supporting or fixing the base. However, these solutions can often only meet the needs of specific scenarios, lack versatility and flexibility, and limit the scope of use.

In order to solve this technical problem, the application provides a mobile phone holder.

As shown in FIGS. 1-6, The mobile phone holder specifically comprises: a bottom shell 1, a base 101 is arranged inside the bottom shell 1, and a suction cup 105 and a magnet block 104 are fixedly installed at the bottom of the base 101.

The mobile phone holder provided by this application can achieve double adsorption by setting a suction cup 105 and a magnet block 104. The suction cup 105 uses the negative pressure principle to be tightly adsorbed on a variety of non-magnetic smooth surfaces such as glass, plastic, and wood, providing users with a wide range of placement options, while the magnet block 104 is specially designed for objects made of iron or containing ferromagnetic materials, such as metal desktops, car dashboards, etc., and is directly adsorbed by magnetic force without any additional fixing devices, thereby achieving the convenience of quick installation and disassembly; the double adsorption design enables the mobile phone holder to adapt to more diverse usage scenarios, and a suitable installation position can be easily found at home, in the office, in the car, or outdoors; the user does not need to carry additional tools or accessories, and can complete installation and disassembly by relying solely on the adsorption function of the holder itself, which is simple and quick to operate; the combination of the suction cup 105 and the magnet block 104 greatly broadens the scope of application of the mobile phone holder, which can cover almost all common smooth surfaces and iron objects, meet the needs of different users, and improve the versatility and flexibility of the application.

To enable people in the technical field to better understand the solution of this application, the technical solution in the embodiment of the application will be clearly and completely described below in conjunction with the accompanying drawings.

It should be noted that the embodiments of the application and the features and technical solutions in the embodiments can be combined with each other without conflict.

As shown in FIGS. 1 to 6, the mobile phone holder includes a bottom shell 1, a base 101 is arranged inside the bottom shell 1, and a suction cup 105 and a magnet block 104 are fixedly installed at the bottom of the base 101; the present application can achieve double adsorption by arranging the suction cup 105 and the magnet block 104, and the suction cup 105 can be tightly adsorbed on various non-magnetic smooth surfaces such as glass, plastic, and wood by using the negative pressure principle, providing users with a wide range of placement options, and the magnet block 104 is specially designed for objects made of iron or containing ferromagnetic materials, such as metal desktops, car dashboards, etc., and is directly adsorbed by magnetic force without any additional fixing The fixed device realizes the convenience of quick installation and disassembly; the double adsorption design enables the mobile phone holder to adapt to more diverse usage scenarios, whether at home, in the office, in the car or outdoors, it is easy to find a suitable installation location; the user does not need to carry additional tools or accessories, and can complete the installation and disassembly by relying solely on the adsorption function of the holder itself, which is simple and quick to operate; the combination of the suction cup 105 and the magnet block 104 greatly broadens the scope of application of the mobile phone holder, which can cover almost all common smooth surfaces and iron objects, meet the needs of different users, and improve the versatility and flexibility of the present application.

Figure 2:
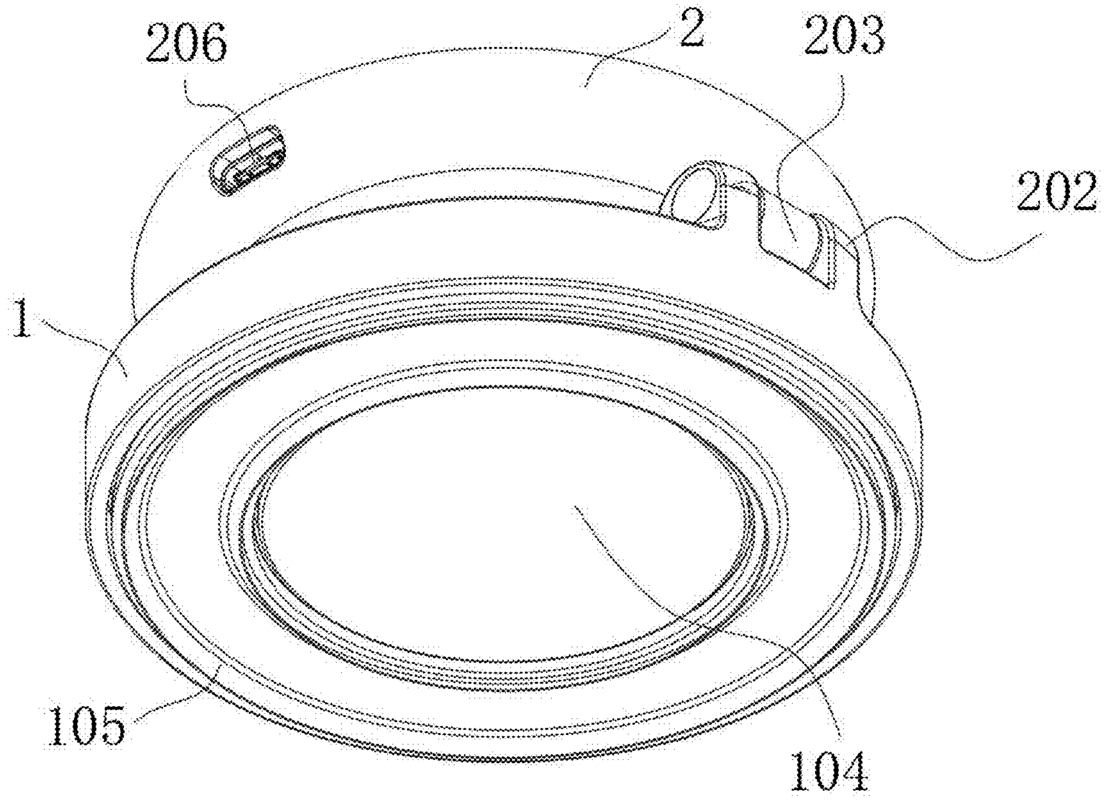
FIG. 2 is another perspective view of a mobile phone holder, according to an embodiment.
Figure 5:
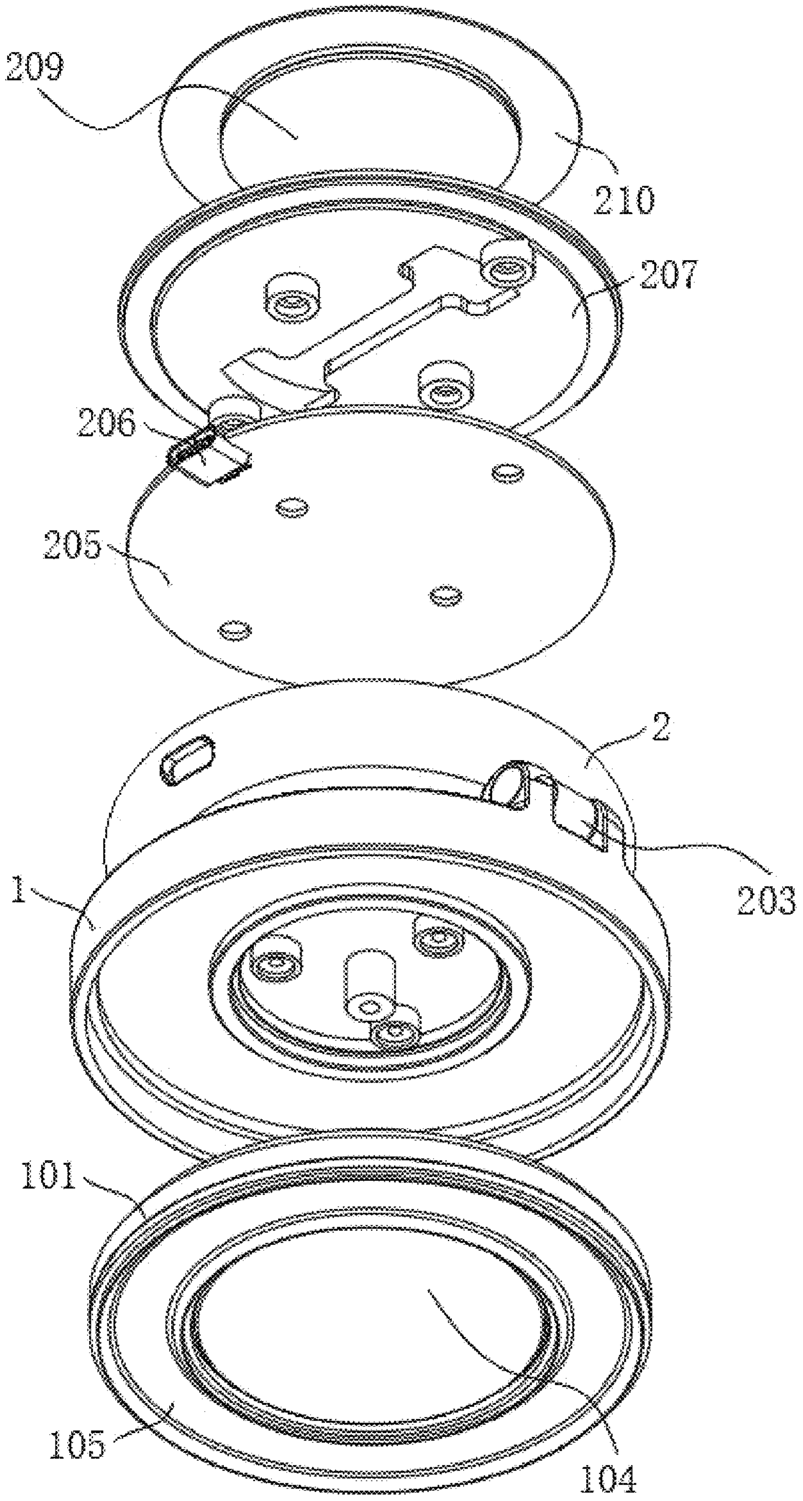
FIG. 5 is another perspective view of a mobile phone holder in separate condition, according to an embodiment.

Wherein, as shown in FIG. 2 and FIG. 5, the suction cup 105 is arranged in a circular ring shape, and the magnet block 104 is located at the center of the suction cup 105. The suction cup 105 is made of silicone.

Wherein, the outer surface of the base 101 is rotatably connected to the inner wall of the bottom shell 1, so that the bottom shell 1 can be rotated, thereby facilitating the adjustment of the angle of the mobile phone.

Figure 6:
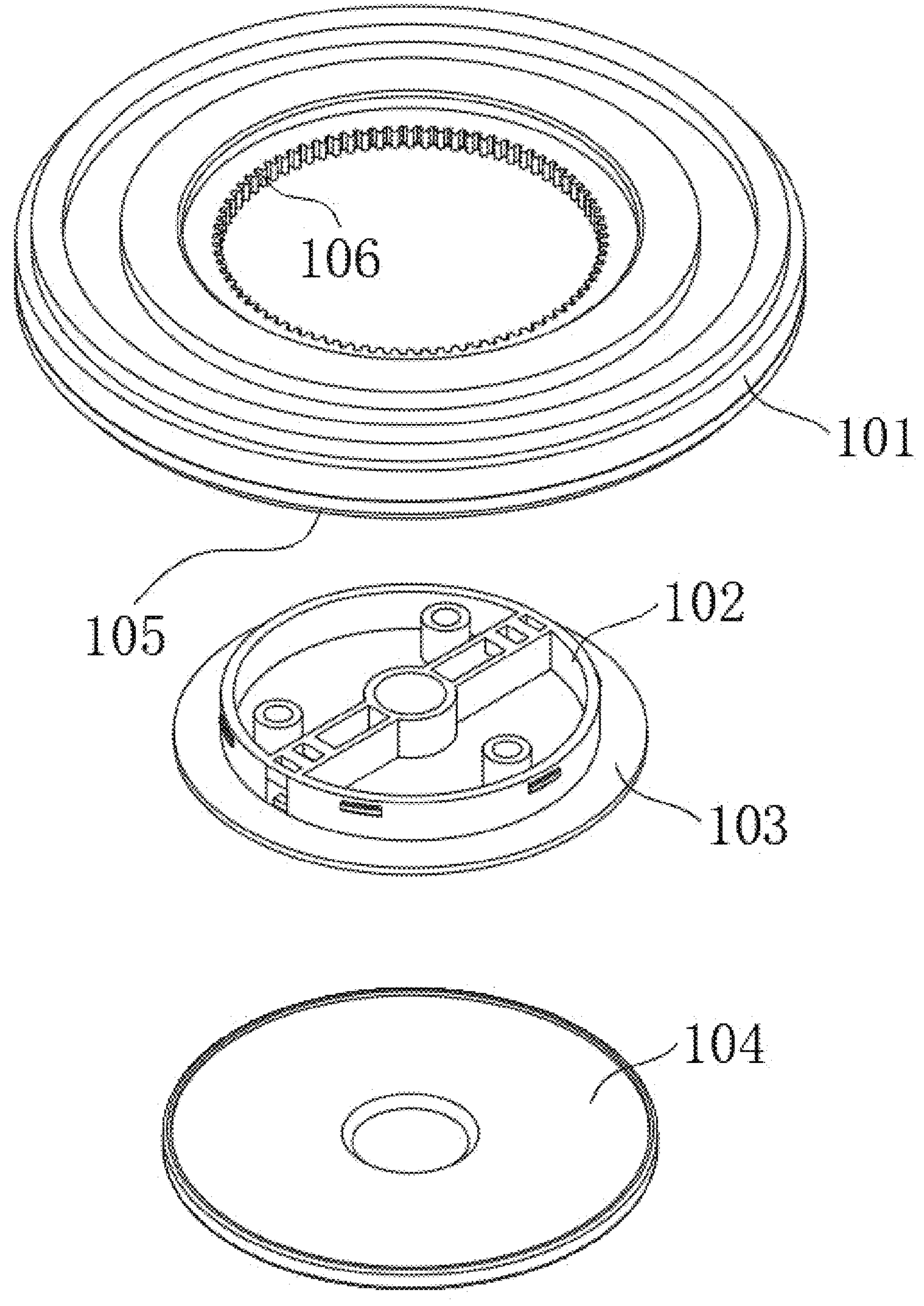
FIG. 6 is a perspective view of a raised ridge in separate condition, according to an embodiment.

Wherein, as shown in FIG. 6, a connecting column 102 is inserted into the middle of the base 101, and a baffle 103 is fixedly connected to the bottom of the connecting column 102. The connecting column 102 and the base 101 are connected by bolts. The outer diameter of the baffle 103 is larger than the inner diameter of the base 101. The base 101 and the bottom shell 1 can be connected by the mutual cooperation of the baffle 103 and the connecting column 102, ensuring that the base 101 will not be separated from the bottom shell 1 and the bottom shell 1 can rotate.

Wherein, as shown in FIG. 6, a plurality of raised ridge 106 are provided on the inner wall of the base 101, and the raised ridge 106 are in contact with the outer surface of the connecting column 102. The provision of the raised ridge 106 increases the roughness of the inner wall of the base 101, thereby increasing the friction with the connecting column 102 so that the bottom shell 1 and the connecting column 102 can stay in the corresponding position after rotation.

Figure 3:
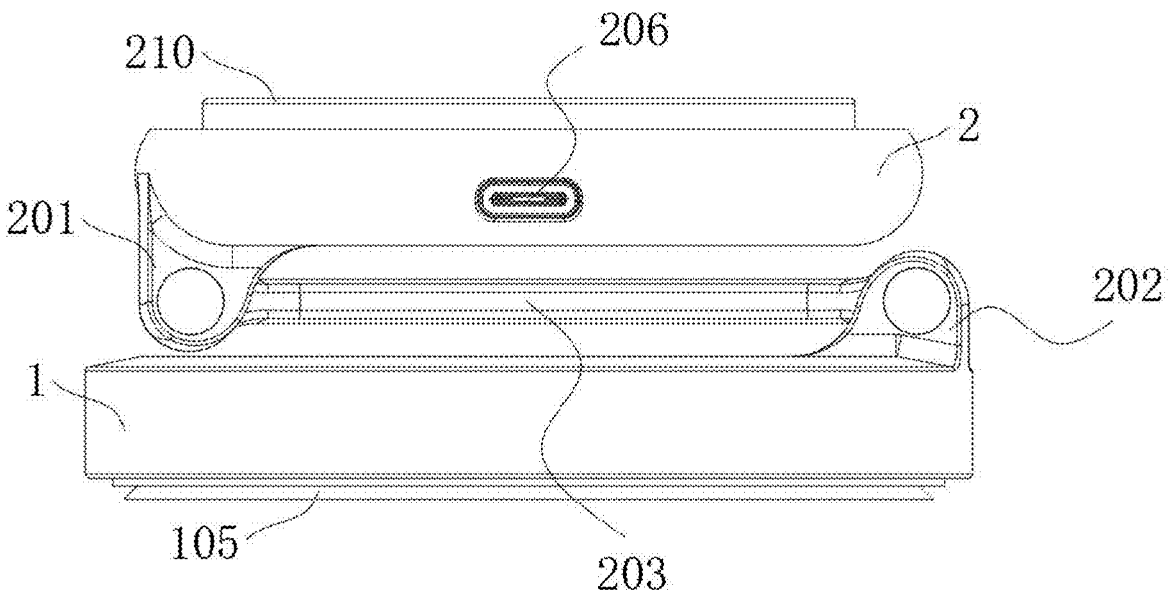
FIG. 3 is a side view of a mobile phone holder, according to an embodiment.

Embodiment 2, further optimization of the mobile phone holder provided in Embodiment 1, wherein as shown in FIGS. 1-3, An upper shell 2 is arranged above the bottom shell 1, and two first connecting seats 201 are arranged at the bottom of the upper shell 2, and a connecting plate 203 is connected between the two first connecting seats 201 by bolts, and two second connecting seats 202 are arranged on the top of the bottom shell 1, and the connecting plate 203 and the two second connecting seats 202 are connected by bolts, and the connecting plate 203 and the outer surfaces of the two bolts are movably connected, and the two first connecting seats 201 and the two second connecting seats

202 clamp the connecting plates 203 under the action of the bolts to increase the friction between the connecting plates 203 and the second connecting seats 202 and the first connecting seats 201. This arrangement allows the angle of the upper shell 2 to be adjusted by manual bending, and the upper shell 2 will not move due to its own gravity and the gravity of the mobile phone after the angle is adjusted.

Figure 4:
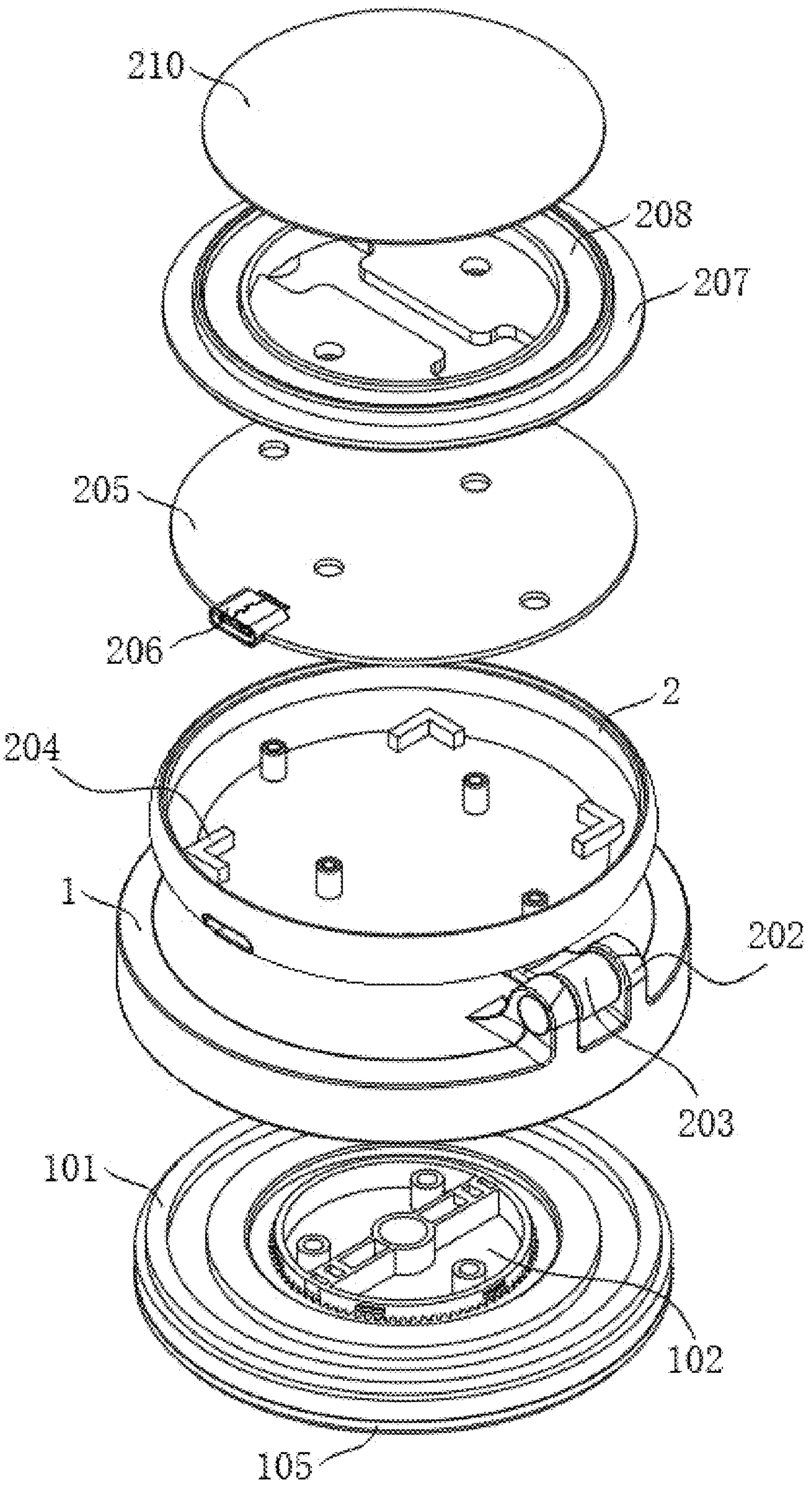
FIG. 4 is a perspective view of a mobile phone holder in separate condition, according to an embodiment.

Embodiment 3, further optimization of the mobile phone holder provided in Embodiments 1 and 2, wherein as shown in FIGS. 4 and 5, a plurality of pads 204 are fixedly installed at the bottom of the inner cavity of the upper shell 2, a circuit board 205 is placed between the tops of the plurality of pads 204, a power supply interface 206 is provided on the circuit board 205, a through hole for plugging with the power supply interface 206 is opened on the upper shell 2, and the power supply interface 206 is used to connect to an existing charger.

Wherein, as shown in FIG. 5, an upper cover 207 located above the circuit board 205 is disposed in the upper shell 2, and a wireless charging coil 209 is disposed in the upper cover 207. The provision of the wireless charging coil 209 enables the present application to perform wireless charging for the mobile phone.

Wherein, as shown in FIG. 4, a magnet ring 208 is also provided inside the upper cover 207. The magnet ring 208 can attract the mobile phone and improve the stability of the mobile phone when placed.

Wherein, as shown in FIG. 4, a cover plate 210 is arranged between the magnet ring 208 and the top of the wireless charging coil 209. The cover plate 210 can protect the magnet ring 208 and the wireless charging coil 209 and improve the overall aesthetics. After placing the mobile phone on the cover plate 210, the mobile phone is adsorbed by the magnet ring 208 and wirelessly charged through the wireless charging coil 209.

In the present application, unless otherwise clearly specified and limited, the terms "installed", "connected", "connected", "fixed" and the like should be understood in a broad sense, for example, it can be a fixed connection, a detachable connection, or an integral one; it can be a mechanical connection, an electrical connection, or communication with each other; it can be a direct connection or an indirect connection through an intermediate medium, it can be the internal connection of two elements or the interaction relationship between two elements, unless otherwise clearly defined. For ordinary technicians in this field, the specific meanings of the above terms in the present invention can be understood according to specific circumstances.

The invention claimed is:

1. A mobile phone holder comprising:

a bottom shell, wherein a base is arranged inside the bottom shell, and a suction cup and a magnet block are fixedly mounted on the bottom of the base, wherein the outer surface of the base is rotatably connected to the inner wall of the bottom shell, wherein a connecting column is inserted and connected in the middle of the base, a baffle is fixedly connected to the bottom of the connecting column, wherein an upper shell is arranged above the bottom shell;

wherein a plurality of pads are fixedly mounted on the bottom of the inner cavity of the upper shell, a circuit board is placed between the tops of the plurality of pads, a power supply interface is provided on the circuit board, and a through hole for plugging into the power supply interface is provided on the upper shell, wherein a plurality of raised ridges are provided on the inner wall of the base, and the raised ridge are in contact with the outer surface of the connecting column, wherein an upper cover located above the circuit board is arranged in the upper shell, and wherein a wireless charging coil and a magnet ring are arranged in the upper cover.

2. The mobile phone holder of claim 1, wherein the suction cup is arranged in a circular ring shape, and the magnet block is located at the center of the suction cup.

3. The mobile phone holder of claim 1, wherein the connecting column and the base are connected by bolts.

4. The mobile phone holder of claim 1, wherein the two first connecting seats are arranged at the bottom of the upper shell; wherein a connecting plate is connected between the two first connecting seats by bolts; two second connecting seats are arranged at the top of the bottom shell; the connecting plate is connected to the two second connecting seats by bolts.

5. The mobile phone holder of claim 4, wherein a cover plate is provided between the magnet ring and the top of the wireless charging coil.

* * * * *